United States Patent
Bae et al.

(10) Patent No.: US 12,484,055 B2
(45) Date of Patent: Nov. 25, 2025

(54) METHODS TO DETERMINE MAXIMUM NUMBER OF VALID UNICAST DCI PER SPAN AND MONITORING OCCASION

(71) Applicant: Samsung Electronics Co., Ltd., Gyeonggi-do (KR)

(72) Inventors: Jung Hyun Bae, San Diego, CA (US); Hamid Saber, San Jose, CA (US)

(73) Assignee: Samsung Electronics Co., Ltd. (KR)

( * ) Notice: Subject to any disclaimer, the term of this patent is extended or adjusted under 35 U.S.C. 154(b) by 277 days.

(21) Appl. No.: 17/179,077

(22) Filed: Feb. 18, 2021

(65) Prior Publication Data
US 2021/0307039 A1    Sep. 30, 2021

Related U.S. Application Data

(60) Provisional application No. 63/000,601, filed on Mar. 27, 2020, provisional application No. 63/004,590, filed on Apr. 3, 2020.

(51) Int. Cl.
*H04W 72/1273*    (2023.01)

(52) U.S. Cl.
CPC .............................. *H04W 72/1273* (2013.01)

(58) Field of Classification Search
CPC ... H04L 5/0053; H04L 5/0096; H04L 5/0064; H04L 5/0007; H04W 72/1273
See application file for complete search history.

(56) References Cited

U.S. PATENT DOCUMENTS

| | | | |
|---|---|---|---|
| 8,861,500 B2 | 10/2014 | Dai et al. | |
| 11,736,331 B2 | 8/2023 | Pan et al. | |
| 2019/0313390 A1 | 10/2019 | Cheng | |
| 2019/0380119 A1 | 12/2019 | Zeng et al. | |
| 2020/0029356 A1 | 1/2020 | Choi et al. | |
| 2020/0145984 A1 | 5/2020 | Hosseini et al. | |
| 2020/0154413 A1* | 5/2020 | Hosseini | H04W 72/0446 |
| 2020/0236699 A1* | 7/2020 | Nakashima | H04L 5/0053 |
| 2020/0244507 A1* | 7/2020 | Pan | H04W 72/048 |
| 2020/0245395 A1* | 7/2020 | Zhang | H04L 5/0053 |
| 2020/0280971 A1* | 9/2020 | Moon | H04L 5/0053 |
| 2020/0351921 A1 | 11/2020 | Xu et al. | |

(Continued)

FOREIGN PATENT DOCUMENTS

| WO | WO 2019/029425 | 2/2019 |
|---|---|---|
| WO | WO 2020/033647 | 2/2020 |
| WO | WO-2021224283 A1 * | 11/2021 |

OTHER PUBLICATIONS

3GPP TR 38.822 V15.0.1 (Jul. 2019) Technical Report, 3rd Generation Partnership Project; Technical Specification Group Radio Access Network.

(Continued)

*Primary Examiner* — Noel R Beharry
*Assistant Examiner* — Rodrick Mak
(74) *Attorney, Agent, or Firm* — The Farrell Law Firm, P.C.

(57) ABSTRACT

A method and system are provided. The method includes receiving a number of physical downlink control channels (PDCCHs) for decoding, determining a maximum number of valid downlink control information (DCIs) that can be decoded, increasing a maximum number of PDCCHs that can be decoded based on the determined maximum number of valid DCIs, and decoding the number of PDCCHs.

14 Claims, 9 Drawing Sheets

(56) References Cited

U.S. PATENT DOCUMENTS

| | | | | |
|---|---|---|---|---|
| 2021/0266831 A1* | 8/2021 | Zhou | ................. | H04W 72/1284 |
| 2021/0352501 A1* | 11/2021 | Taherzadeh Boroujeni | ................ | |
| | | | | H04W 24/08 |
| 2022/0086810 A1* | 3/2022 | Wang | .................... | H04L 5/0044 |
| 2022/0225319 A1* | 7/2022 | Khoshnevisan | .. | H04W 72/0453 |
| 2022/0322346 A1* | 10/2022 | Sun | ....................... | H04L 5/0053 |
| 2023/0125672 A1* | 4/2023 | Grossmann | ........... | H04W 72/23 |
| 2023/0209565 A1* | 6/2023 | Shi | ........................ | H04W 72/20 |
| | | | | 370/329 |

OTHER PUBLICATIONS

NR; User Equipment (UE) feature list (Release 15), 64 pages.
Korean Office Action dated Sep. 30, 2025 issued in counterpart application No. 10-2021-0034593, 5 pages.

* cited by examiner

METHODS TO DETERMINE MAXIMUM NUMBER OF VALID UNICAST DCI PER SPAN AND MONITORING OCCASION

PRIORITY

This application is based on and claims priority under 35 U.S.C. § 119(e) to U.S. Provisional Patent Application Ser. No. 63/000,601, filed on Mar. 27, 2020, and U.S. Provisional Patent Application Ser. No. 63/004,590, filed on Apr. 3, 2020, the entire contents of which are incorporated herein by reference.

FIELD

The present disclosure is generally related to channel scheduling and decoding.

BACKGROUND

In Release 15 (Rel-15), cross carrier scheduling (CCS) is supported where a cell, referred to as a scheduling cell, transmits downlink (DL) control information (DCI) for a different cell, referred to as a scheduled cell. In Rel-15, the numerology $\mu_1$ of scheduling cell needs to be equal to the numerology $\mu_2$ of the scheduled cell. CCS with different numerologies (i.e., $\mu_1 \neq \mu_2$) is not supported in Rel-15. There is a strong use case for frequency range (FR1) scheduling FR2. This is because FR1 (i.e., sub6) tends to have better coverage and it is more reliable to deliver DCI on FR1. CCS can be an effective way for delivering DCI for FR2 on FR1. CCS with different numerologies between a scheduling cell and the scheduled cell can be of practical value at least for the case of lower subcarrier spacing (SCS) cell scheduling a higher SCS cell and has been decided to be introduced in Rel-16. Although no strong use case for scheduling a lower SCS by a higher SCS cell was identified, it has been agreed to support this case for Rel-16 mainly because of lower needed specification effort.

SUMMARY

According to one embodiment, a method includes receiving a number of physical downlink control channels (PDCCHs) for decoding, determining a maximum number of valid DCIs that can be decoded, increasing a maximum number of PDCCHs that can be decoded based on the determined maximum number of valid DCIs, and decoding the number of PDCCHs.

According to one embodiment, a system includes a memory and a processor configured to receive a number of PDCCHs for decoding, determine a maximum number of valid DCIs that can be decoded, increase a maximum number of PDCCHs that can be decoded based on the determined maximum number of valid DCIs, and decode the number of PDCCHs

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1$^{st}$," "2$^{nd}$," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

Figure 1:
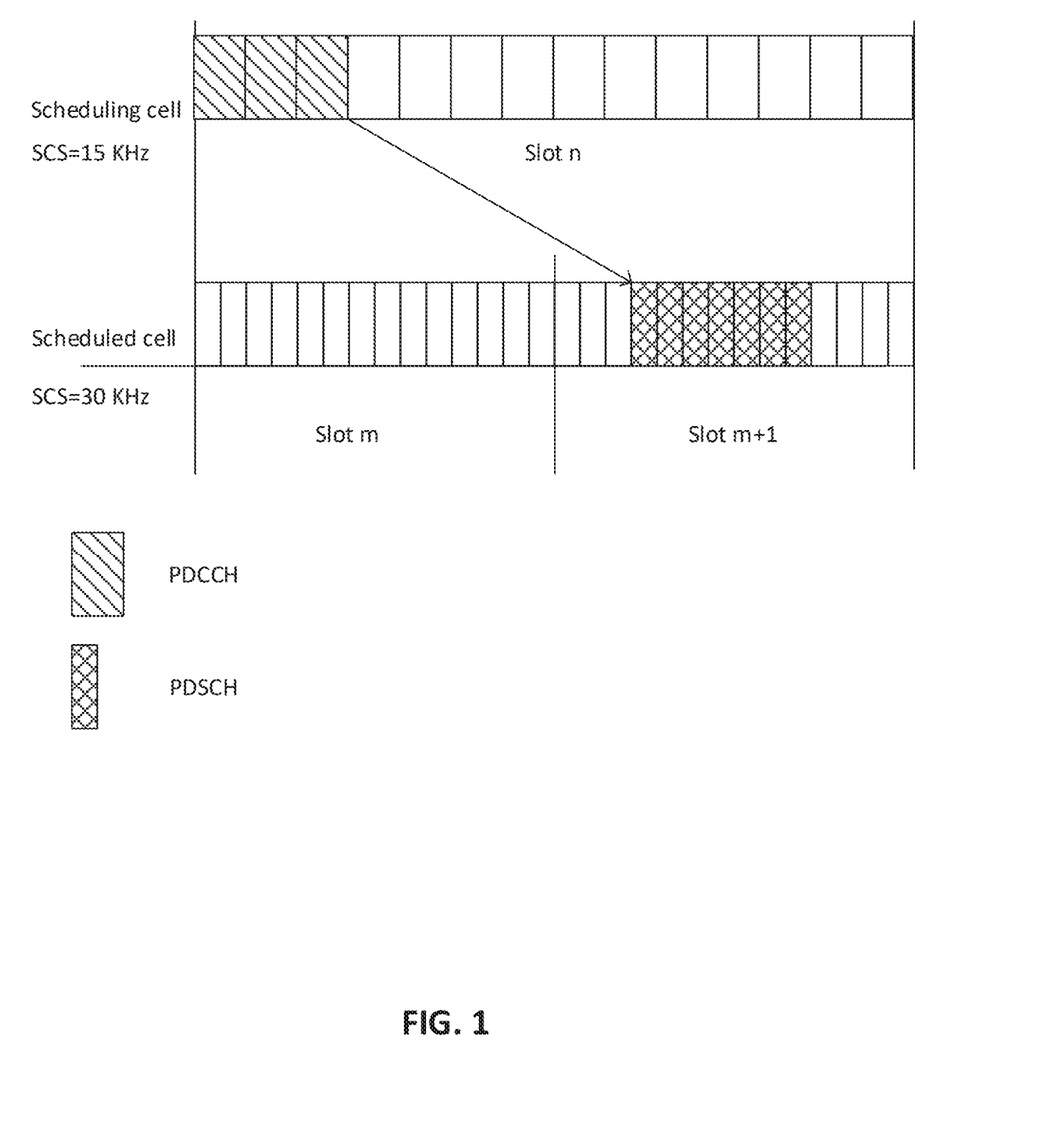
FIG. 1 illustrates a diagram of a scheduling cell and a scheduled cell, according to an embodiment.

FIG. 1 illustrates a diagram of a scheduling cell and a scheduled cell, according to an embodiment. FIG. 1 shows an example of CCS with different numerologies where a scheduling cell of SCS=15 KHz schedules a scheduled cell of SCS=30 KHz. A PDCCH is transmitted on the first three symbols of slot n of the scheduling cell which schedules a physical downlink shared channel (PDSCH) on slot m+1 of the scheduled cell.

Compared to self-scheduling (i.e., when PDCCH and PDSCH are on the same serving cell), CCS with different numerologies require higher buffering due to a worse PDCCH timeline. This is because PDCCH decoding on a smaller SCS cell takes longer time than higher SCS cell.

Figure 2:
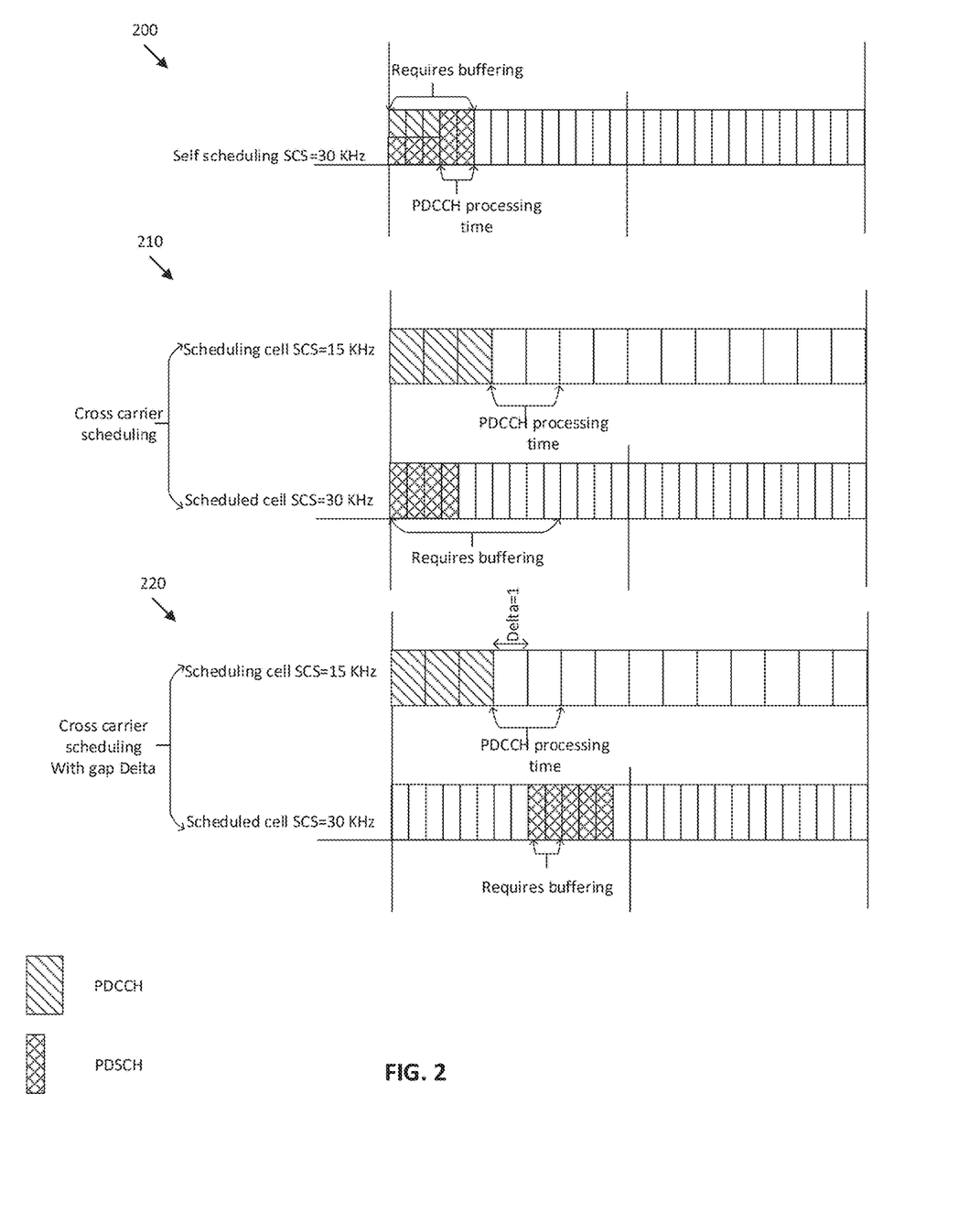
FIG. 2 illustrates a diagram of scheduling cells and scheduled cells, according to an embodiment.

FIG. 2 illustrates a diagram of scheduling cells and scheduled cells, according to an embodiment. FIG. 2 illustrates the buffering issue for CCS with different numerologies. In a first case 200, self-scheduling on SCS=30 KHz, assuming PDCCH processing time is 2 OFDM symbols, the UE needs to buffer 5 symbols as it is unaware of the PDSCH start location. In a second case 210, if the PDCCH is instead moved to a different cell with SCS=15 KHz, assuming the same number of symbols for PDCCH decoding, the UE needs to buffer 10 symbols. This is because the UE does not know where the PDSCH is scheduled until it has decoded the PDCCH. As can be seen, the buffering requirement can significantly increase for CCS. To mitigate the issue, it has been decided to introduce a gap, referred to as Δ gap, in Rel-16 from the end of PDCCH to the start of PDSCH such that the earliest possible start time of the PDSCH is A symbols from the end of the PDCCH. To see how this helps, assume Δ=1. In a third case 220, the UE is assured that network will not schedule a PDSCH earlier than 1 symbol after the end of the PDCCH. This significantly reduces the buffering requirement to only 2 symbols. Table 1 shows the agreed Δ offset values in Rel-16. Taking SCS=15 KHz as an example, the earliest possible start time of the PDSCH is 4 symbols of SCS=15 KHz after the end of the PDCCH, regardless of the SCS of scheduled cell.

TABLE 1

| Scheduling cell SCS | Δ (symbols of scheduling cell numerology) |
|---|---|
| 15 | 4 |
| 30 | 5 |
| 60 | 10 |
| 120 | 14 |

Rel-15 NR has defined three PDCCH monitoring cases. The first case (i.e., Case 1-1) is slot-based scheduling which requires PDCCH monitoring only in the beginning of the slot. The second case (i.e., Case 1-2) is a shifted version of the first case only for SCS of 15 kHz. The third case (i.e., Case 2) is non-slot-based scheduling that allows PDCCH transmission anywhere in the slot.

Figure 3:
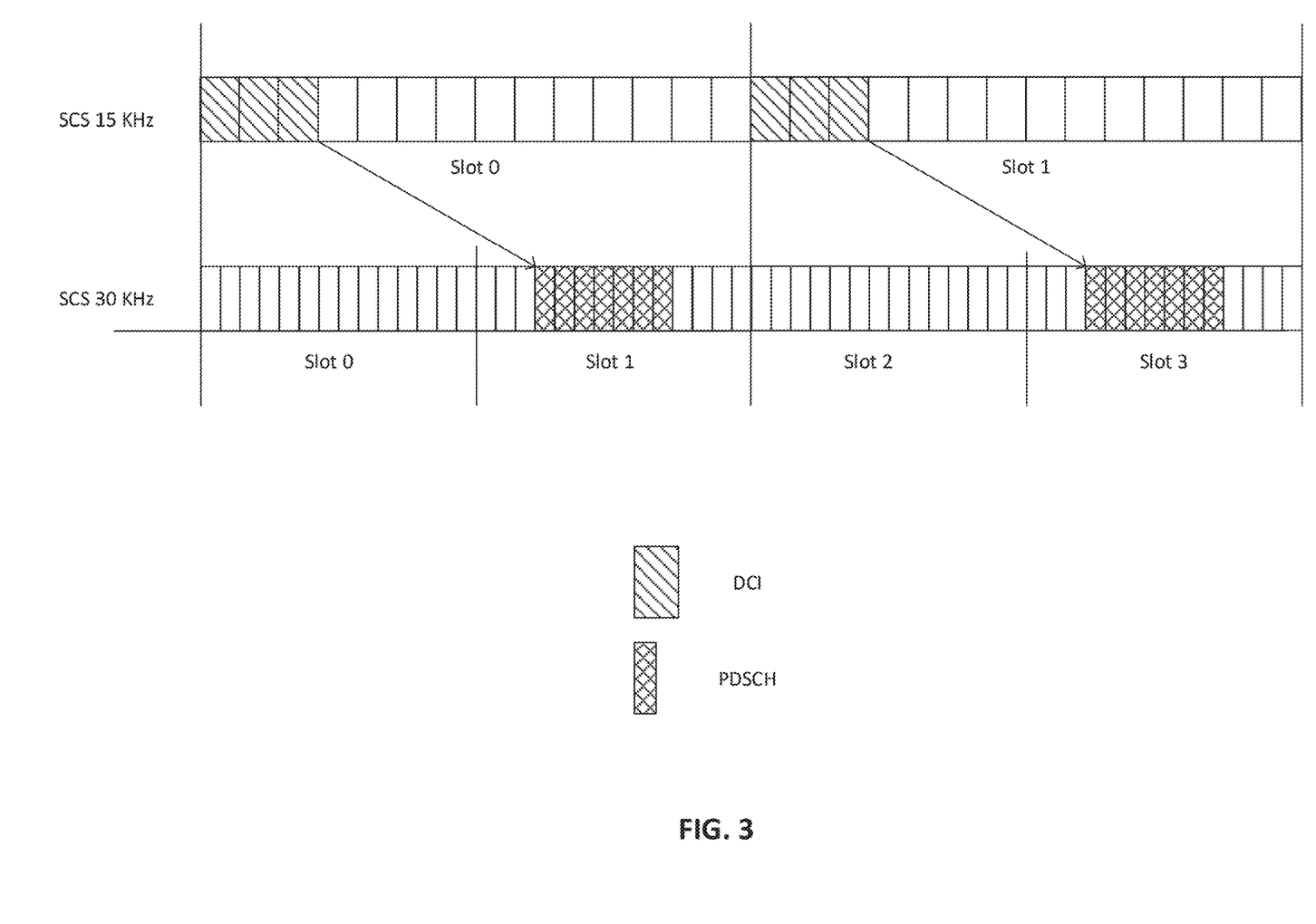
FIG. 3 illustrates a diagram of data transmission, according to an embodiment.

FIG. 3 illustrates a diagram of data transmission, according to an embodiment. FIG. 3 illustrates that contiguous data transmission in the scheduled cell is not possible with Case 1-1 PDCCH monitoring in Rel-15.

In the case of a lower SCS cell scheduling a higher SCS, to have contiguous data transmission on the scheduled cell, there should be enough valid DCIs per slot of the scheduling cell. At least for a basic DL control channel UE capability feature group, at most 1 unicast DCI for scheduling DL per slot per scheduled component carrier (CC) (or serving cell) is supported. For such a UE, having contiguous data transmission on the scheduled cell may not be possible as shown below.

Figure 4:
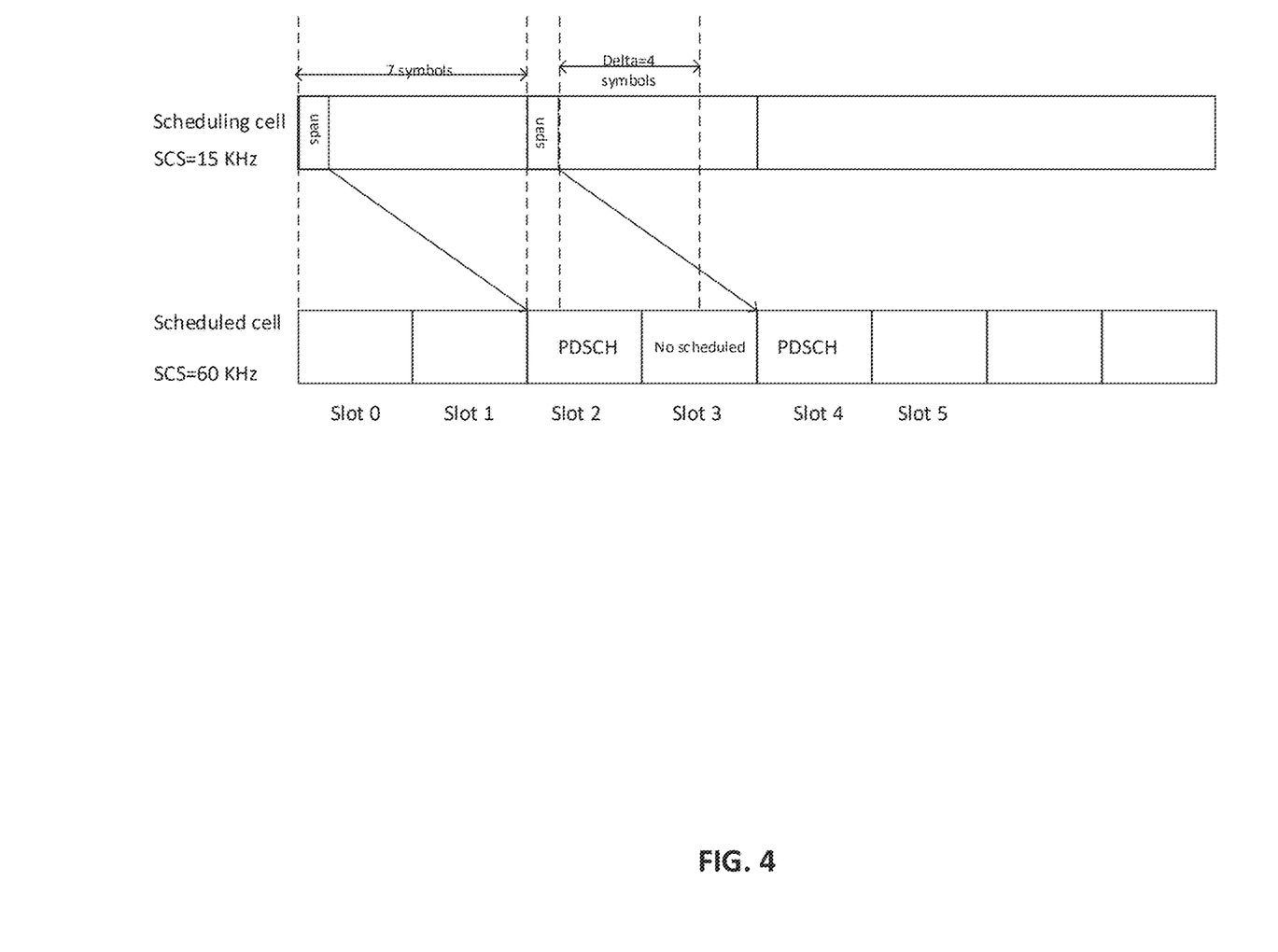
FIG. 4 illustrates a diagram of data transmission, according to an embodiment.

FIG. 4 illustrates a diagram of data transmission, according to an embodiment. As can be seen, the number of unicast DCIs per span is limited to 1 per scheduled cell for frequency division duplex (FDD) and 2 for time division duplex (TDD). An upper limit of 1 DCI per span may not be enough to realize contiguous data transmission on the scheduled cell. FIG. 4 shows an example. A UE indicating {(4,3), (7,3)} may not support contiguous data transmission for scheduling SCS=15 KHz and scheduled SCS=60 KHz. As can be seen, no PDSCH can be scheduled due to Δ=4 for scheduling SCS=15 KHz.

Therefore, the maximum number of valid unicast DCIs per slot needs to be increased. Disclosed herein are systems and methods to specify the UE capability for an increased number of valid unicast DCIs per slot.

To support contiguous data transmission on the scheduled when $\mu_{PDCCH} < \mu_{PDSCH}$, several options are provided herein including increasing the number of valid unicast DCIs per span or per monitoring occasion (MO). One option is to generalize Rel-15 FG 3-5b to increase the maximum number $N_{span}$ of unicast DCI the UE is expected to receive in the set of MOs within a span. In general, N should depend on the SCS of scheduling cell, SCS of scheduled cell and the set of reported (X, Y) by the UE. In Rel-15/16, the UE may report to the gNB a set of (X, Y) based on which gNB can configure the UE with a set of search spaces and CORESETs which determine a set of monitoring occasions in slot. (X, Y) can take values from {(2,2), (4,3), (7,3)}. Once the gNB configures UE with a set of search spaces, a number of PDCCH monitoring spans in the slot are determined which satisfies one or more pair (X, Y). A set of spans in the slot satisfies a pair (X, Y), if the time gap between the start of any two consecutive spans is at least X symbols and every span is at most Y symbols long. For a given span pattern on the scheduling cell, increasing the SCS of scheduled cell increases the number of slots which need to be scheduled by one slot on the scheduling cell. Therefore, $N_{span}$ should be an increasing function of the SCS of the scheduled cell. With a similar argument, it should also be a function of the SCS of the scheduling cell. Other factors such as the values of Δ offset may affect the possibility of contiguous PDSCH scheduling on the scheduled cell. But since the offset values themselves depend on the numerology of scheduling cells, the network may directly set the value of $N_{span}$ based on the two numerologies. Moreover, for a given numerology pair, a more frequent span pattern requires a smaller number of maximum unicast DCIs per span so the value of $N_{span}$ should also depend on the UE's capability to support different span pattern in a slot (i.e., it should depend on the reported set of {(X, Y)} by the UE).

In any span of scheduling cells, the UE is not expected to receive more than $N_{span}$ unicast DCIs per scheduled CC. The value of $N_{span}$ may be configured to the UE via radio resource control (RRC) for each scheduled cell. The value of $N_{span}$ may be fixed and set by the network as a function of the SCS of the scheduling cell or the SCS of scheduled cell. Table 2 shows exemplary values for the maximum per-span limit for $N_{span}$ being fixed and set by the network as a function of the SCS of the scheduling cell and the SCS of scheduled cell.

TABLE 2

| SCS of scheduling cell | SCS of scheduled cell | $N_{span}$ |
| --- | --- | --- |
| 15 | 30 | 2 |
| 15 | 60 | 4 |
| 15 | 120 | 4 |
| 30 | 60 | 2 |
| 30 | 120 | 4 |
| 60 | 120 | 4 |

The value of $N_{span}$ may be fixed and set by network as a function of the SCS of the scheduling cell, the SCS of scheduled cell, and the reported set of (X, Y) pairs by the UE. Table 3 shows exemplary values for the maximum per-span limit for $N_{span}$ being fixed and set by network as a function of the SCS of the scheduling cell, the SCS of scheduled cell, and the reported set of (X, Y) pairs by the UE.

TABLE 3

| SCS of scheduling cell | SCS of scheduled cell | Smallest X reported by the UE | $N_{span}$ |
| --- | --- | --- | --- |
| 15 | 30 | X ≥ 4 | 2 |
| | | X = 2 | 1 |
| 15 | 60 | X ≥ 4 | 4 |
| | | X = 2 | 1 |
| 15 | 120 | X ≥ 4 | 4 |
| | | X = 2 | 2 |
| 30 | 60 | X ≥ 4 | 2 |
| | | X = 2 | 1 |
| 30 | 120 | X ≥ 4 | 4 |
| | | X = 2 | 1 |
| 60 | 120 | X ≥ 4 | 4 |
| | | X = 2 | 1 |

Defining an increased maximum number of unicast DCI per span will likely result in an increased number of unicast DCIs per MO. Therefore, as an alternative solution, the maximum number of unicast DCIs may be defined per MO instead of per-span.

In any MO within any span, the UE is not expected to receive more than $N_{mo}$ unicast DCIs per scheduled CC. The value of $N_{mo}$ may be configured to the UE via RRC for each scheduled cell. The value of $N_{mo}$ may be fixed and set by network as a function of the SCS of the scheduling cell and the SCS of scheduled cell. The value of $N_{mo}$ may be fixed and set by network as a function of the SCS of the scheduling cell, the SCS of scheduled cell, and the reported set of (X, Y) pairs by the UE.

Defining a maximum number of unicast DCIs per MO will in turn define a maximum number per span as there is a certain number of MOs per any span. The implicit per-span limit is equal to the per-MO limit multiplied by the number of MOs per span.

A first way to define the MO is based on the actual search space configuration via RRC. This means that with each search space (SS) comes a fixed maximum number of valid unicast DCIs which define the maximum number of valid DCIs in any MO of the SS. The fixed number may be configured to the UE as part of the SS configuration as an extra information element (IE) or be fixed number in the specification. The UE will know, prior to processing of a given SS, how many valid unicast DCIs can possibly be present in the MO.

A second way to define the MO within a span is according to MO index definition for Type-2 hybrid automatic repeat request (HARQ) codebook. With this definition, each SS within the span defines a number of MOs where each MO indicates a number of consecutive symbols within the span on which the UE monitors the PDCCH candidates. The number of consecutive symbols is equal to the length of the CORESET associated with the SS. All the MOs of SSs, with the same or different CORESETs, which have the same start symbol are grouped as one MO. This MO definition is referred to as Type-2 MO definition.

Figure 5:
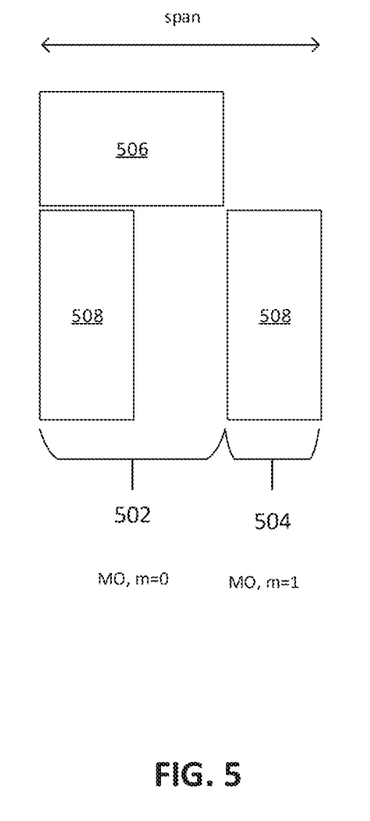
FIG. 5 illustrates a diagram of a span, according to an embodiment.

FIG. 5 illustrates a diagram of a span, according to an embodiment. The span includes a first MO 502 and a second MO 504. The UE is configured with two SS configurations. SS configuration 1 506 is associated with a length-2 CORESET and defines only one MO in the span while SS configuration 2 508 is associated with a length-1 CORESET and defines 2 MOs per span. SS configuration 1 506 indicates to the UE to monitor PDCCH in a set of symbols in the slot shown by the MO 502. This is length-2 CORESET which means that the PDCCH length is 2 symbols. The UE is also configured with a second SS configuration 508 which indicates to the UE to monitor PDCCHs in the first and third symbols of slot. This corresponds to a length-1 CORESET which means that each monitoring occasion is one-symbol long. There are two monitoring occasions 502 and 504 corresponding to SS configuration 2 508. There are two type-2 MOs. The first type-2 MO 502 is indexed as m=0 and the second type-2 MO 504 is indexed as m=1. m=0 includes the first two symbols of the slot while m=1 includes the third symbol. The span may refer to a set of consecutive symbols in the slot. In this case, the span includes the first three symbols of the slot. There may or may not be other spans on other symbols of the slot 1.

From a UE implementation point of view, when the UE is processing a UE specific search space (USS), if a maximum number of valid unicast DCIs have been successfully decoded, the UE may skip decoding of the rest of the PDCCH candidates in the search space. This behavior is referred to as "early stopping" of the PDCCH processing in the search space. The average number of attempted PDCCH decodings depends on the total number of PDCCH candidates and the maximum number of unicast DCIs in the search space (or MO).

In one example, there are $T_{span}$ PDCCH candidates in a span and precisely $N_{span}$ unicast DCIs in the set of MOs in the span, where $N_{span} < T_{span}$. The actual number of attempted decodings is a random variable and may vary from $N_{span}$ to $T_{span}$ depending on how "lucky" the UE is to visit the PDCCH candidates carrying the unicast DCIs early on. Assuming a zero miss detection probability, a probability that the UE ends up decoding a total of n PDCCH candidates for the $N_{span}$ DCIs is, as in Equation (1).

$$p_n = \frac{\binom{n-1}{N_{span}-1}}{\sum_{x=N_{span}}^{T_{span}} \binom{x-1}{N_{span}-1}} \quad (1)$$

The average number, D ($T_{span}$, $N_{span}$), of decoding is then, as in Equation (2).

$$D(T_{span}, N_{span}) = \sum_n n \times p_n = \frac{\sum_{n=N_{span}}^{T_{span}} n\binom{n-1}{N_{span}-1}}{\sum_{x=N_{pan}}^{T_{span}} \binom{x-1}{N_{span}-1}} \quad (2)$$

There may be two MOs in the span and the $N_{span}$ DCIs are distributed in two different MOs (i.e., $N_0$ DCIs are put in $T_0$ PDCCH candidates in the first MO and $N_1$ DCIs are put in $T_1$ candidates in the second MO, where $T_{span}=T_0+T_1$, $N_{span}=N_0+N_1$). Once the UE decodes $N_0$ DCIs in the first MO, it may stop processing of the first MO and start processing of the second MO. The average number of attempted decoding in this case will be as in Equation (3):

$$D(T_0,N_0)+D(T_1,N_1) \quad (3)$$

which is expected to be smaller than $D(T_{span}, N_{span})$.

Figure 6:
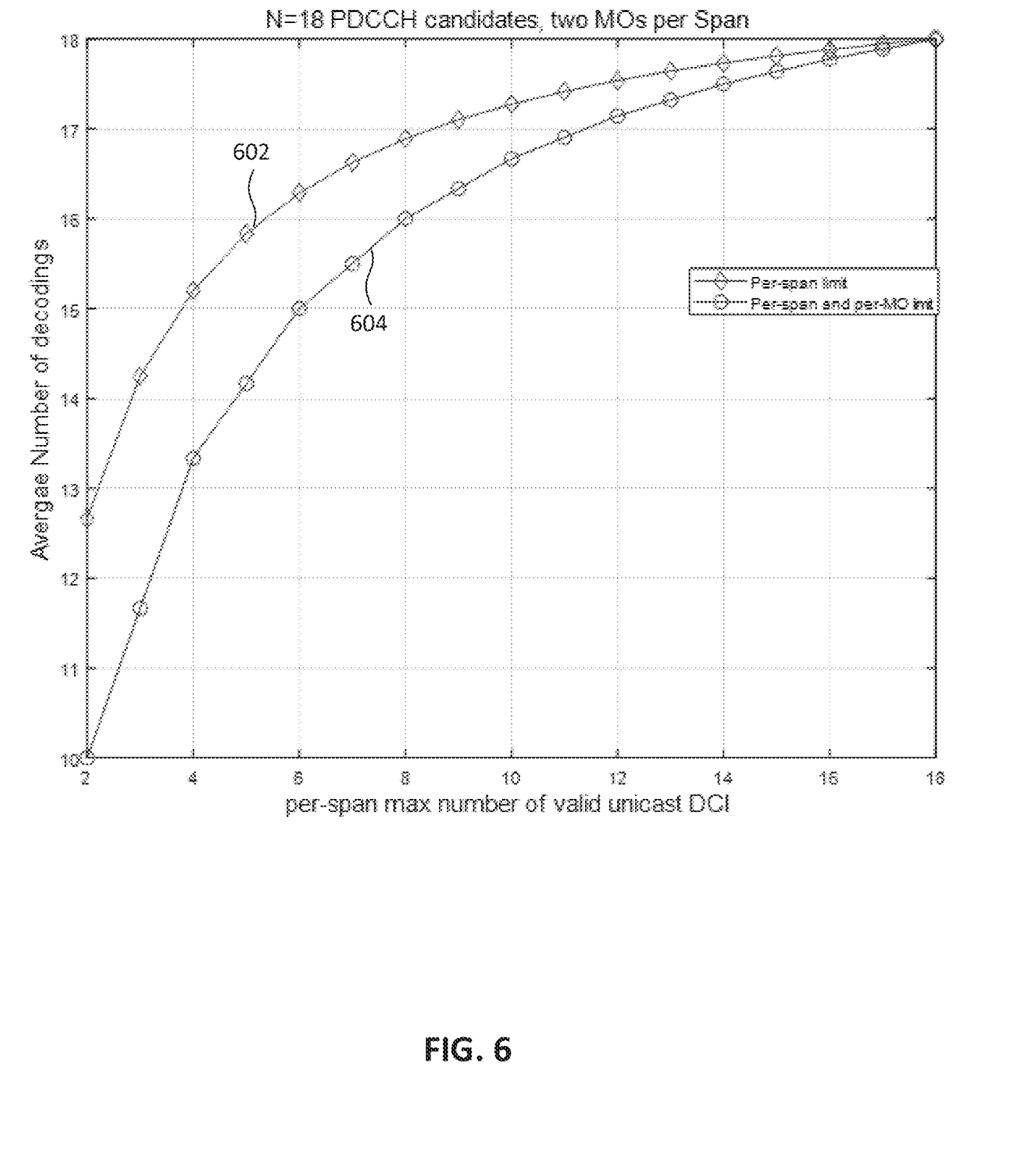
FIG. 6 illustrates a graph showing an average number of decodings, according to an embodiment.

FIG. 6 illustrates a graph showing an average number of decodings, according to an embodiment. Line 602 shows an average number of decodings with a per-span limit, and Line 604 shows an average number of decodings with a per-span and per-MO limit. Introducing a per-MO limit in addition to the per-span limit reduces the average number of attempted PDCCH decodings. FIG. 6 shows a comparison between these two cases for $T_{span}=18$, $T_0=T_1=9$ as a function of $N_{span}=K$ where $$N_0 = \left\lfloor \frac{K}{2} \right\rfloor \text{ and } N_1 = \left\lceil \frac{K}{2} \right\rceil.$$

For $N_{span}=2$, distributing the DCIs in two MOs can result in about 21% reduction on the average number of decoding.

To benefit from the reduced number of PDCCH decoding due to early stopping, the systems and methods introduce both per-span and per-MO limit. In a high level description, the UE is not expected to receive more than $K_{span}$ valid unicast DCIs per span. The UE is not expected to receive more than $K_i$ unicast DCIs per MO for the i-th MO in the span where $\Sigma_i K_i = K$.

A drawback is that it puts restriction on the network as it may not put all the $K_{span}$ valid DCIs in one of the MOs in the span with more than one MO per span. Instead, it is required to distribute them among the MOs. Distributing the DCIs among different MOs seems to have negative impact on the PDSCH scheduling latency. For CCS with different numerologies, some of the PDSCHs may need to be scheduled with an additional delay. However, the additional delay is at most 2 symbols as the span length is at most 3 symbols. There is already a Δ offset in the CCS with different SCS. Increasing the offset by 2 symbols may be still acceptable if contiguous data transmission on the scheduled cell can be achieved.

In any span of a scheduling cell, the UE is not expected to receive more than $N_{span}$ unicast DCIs per scheduled CC. For any MO number m in the span, the UE is not expected to receive more than $N_m$ unicast DCIs per MO in the span, where $$\sum_{m=0}^{M-1} N_m \geq N_{span}$$

and M is the total number of MOs in the span.

The value of $N_m$ may be configured to the UE via RRC by the USS configurations in the MO. If M=1, the value of $N_0 = N_{span}$ for the first MO, and if M>1, the value of $$N_m = \left\lfloor \frac{N_{span}}{M} \right\rfloor$$

for every MO other than the first/last MO. For the first/last MO, $$N_m = N_{span} - (M-1)\left\lfloor \frac{N_{span}}{M} \right\rfloor.$$

$N_m$ may be configured to the UE or determined based on the number M of MOs in span and the per-span limit $N_{span}$.

$$\sum_{m=0}^{M-1} N_m$$

may be equal or larger than $N_{span}$.

Figure 7:
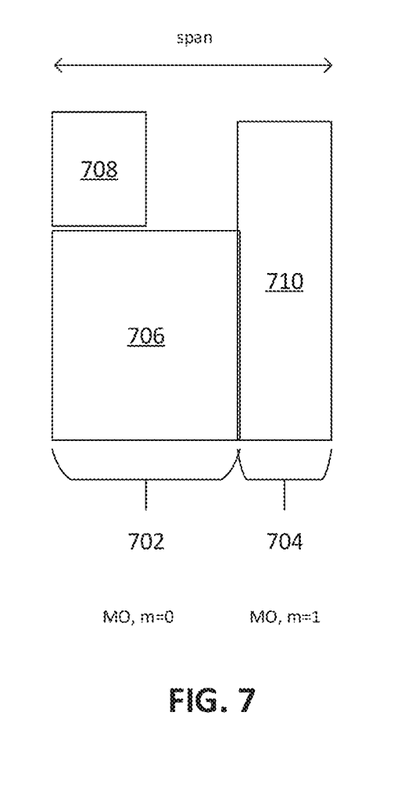
FIG. 7 illustrates a diagram of a span, according to an embodiment.

FIG. 7 illustrates a diagram of a span, according to an embodiment. As an example, consider a length-3 span with two MOs 702 and 704 in FIG. 7. The first MO 702 includes one USS 706 associated with length-2 CORESET and one USS 708 associated with a length-1 CORESET. The second MO 704 includes one USS 710 associated with a length-1 CORESET in the right. $N_{span}=4$, $N_0=2$ and $N_1=2$.

Figure 8:
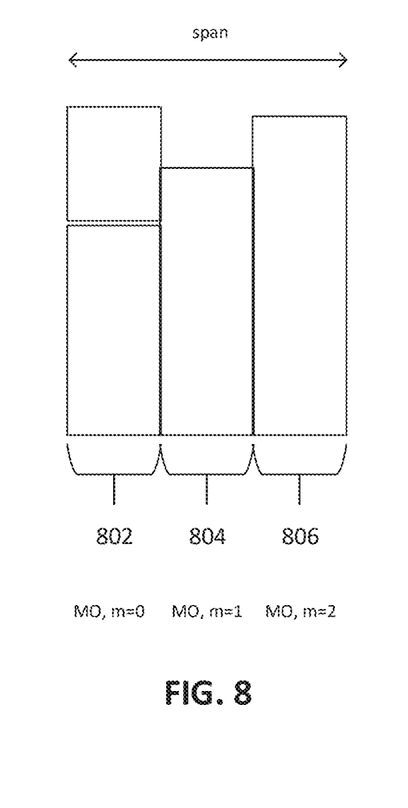
FIG. 8 illustrates a diagram of a span, according to an embodiment.

FIG. 8 illustrates a diagram of a span, according to an embodiment. As a different example shown in FIG. 8, a length-3 span with 3 MOs 802, 804 and 806 is shown. $N_{span}=4$, $N_0=2$, $N_1=1$ and $N_2=1$ if the first MO 802 is chosen to include the largest number of valid DCIs among the MOs. The values of $N_0$, $N_1$, $N_2$ and $N_{span}$ may be set as $N_0=2$, $N_1=2$, $N_2=2$ and $N_{span}=4$. A length-3 span with 3 MOs is shown. $N_{span}=5$ and $$N_0 = N_1 = N_2 = \left\lceil \frac{5}{3} \right\rceil = 2.$$

The UE is not expected to receive more than 2 DCIs in any of the MOs

In any span of scheduling cell, the UE is not expected to receive more than $N_{span}$ unicast DCIs per scheduled CC. For any MO number m in the span, the UE is not expected to receive more than $$N_m = \left\lceil \frac{N_{span}}{M} \right\rceil$$

unicast DUIs per MO in the span, where M is the total number of MOs in the span.

Figure 9:
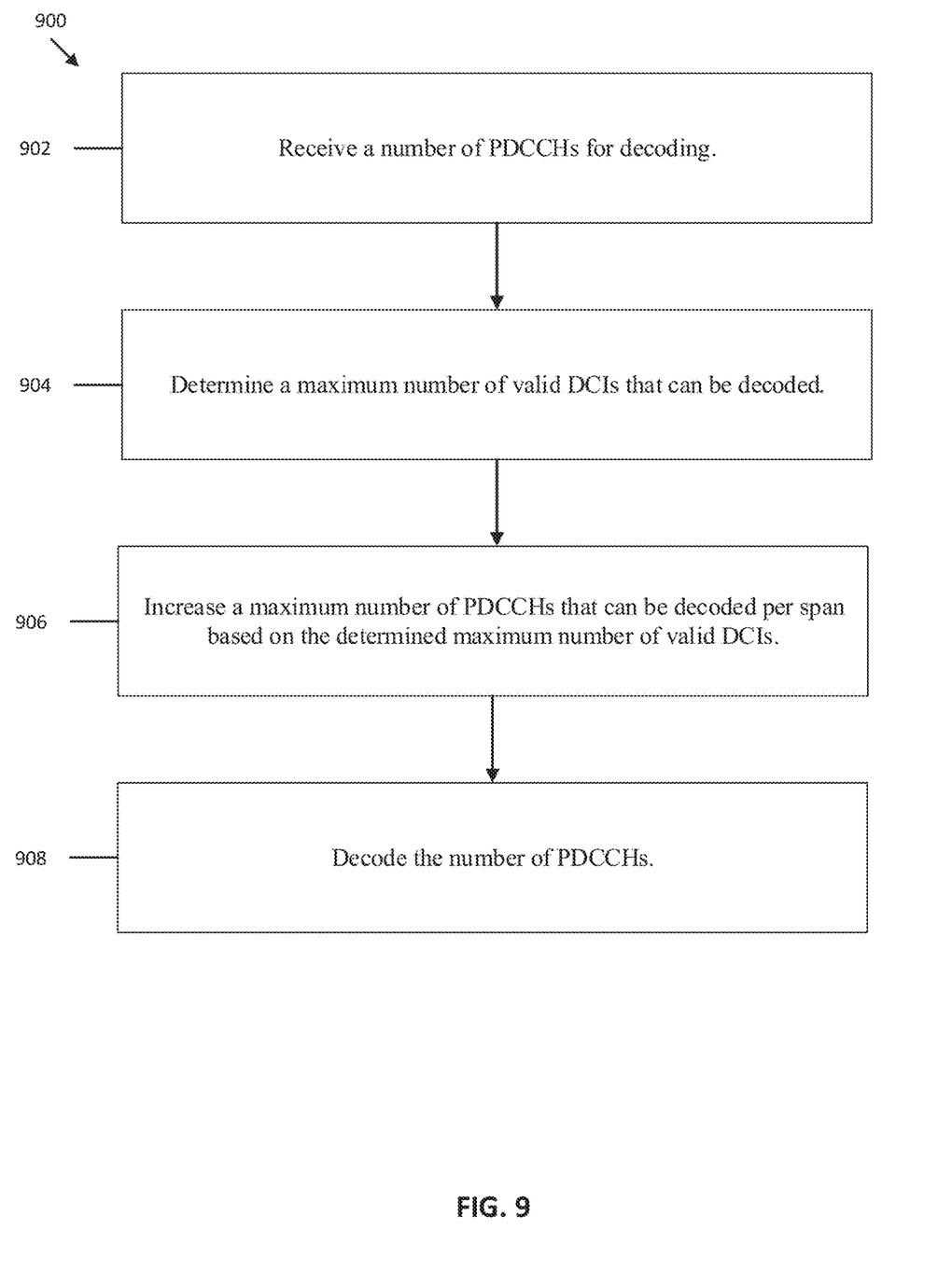
FIG. 9 illustrates a flowchart for a method of decoding channels, according to an embodiment.

FIG. 9 illustrates a flowchart 900 for a method of decoding channels, according to an embodiment. At 902, the system receives a number of PDCCHs for decoding. At 904, the system determines a maximum number of valid DCIs that can be decoded per span. At 906, the system increases a maximum number of PDCCHs that can be decoded per span based on the determined maximum number of valid DCIs. At 908, the system decodes the number of PDCCHs.

Figure 10:
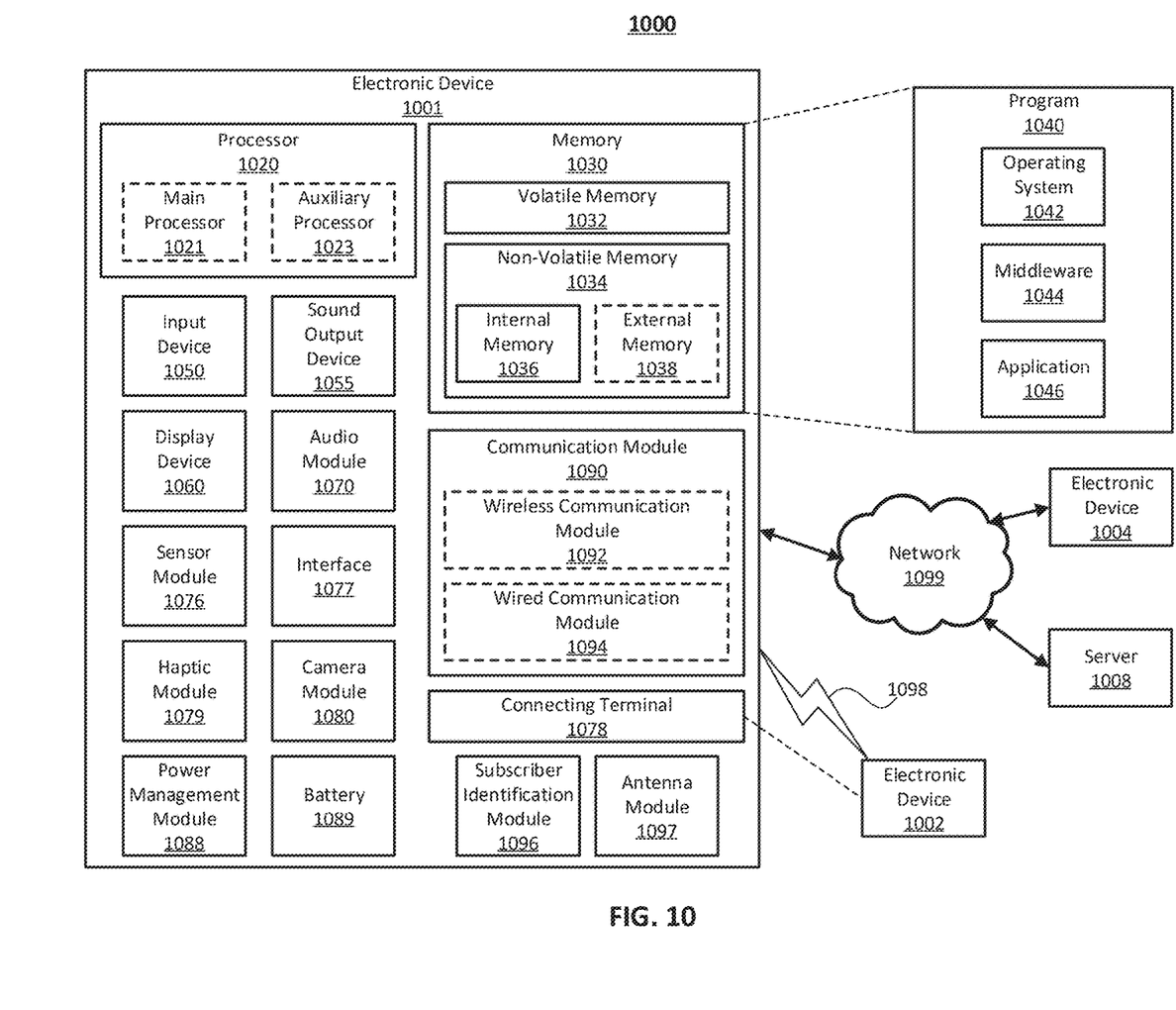
FIG. 10 illustrates a block diagram of an electronic device in a network environment, according to one embodiment.

FIG. 10 illustrates a block diagram of an electronic device 1001 in a network environment 1000, according to one embodiment. Referring to FIG. 10, the electronic device 1001 in the network environment 1000 may communicate with an electronic device 1002 via a first network 1098 (e.g., a short-range wireless communication network), or an electronic device 1004 or a server 1008 via a second network 1099 (e.g., a long-range wireless communication network). The electronic device 1001 may communicate with the electronic device 1004 via the server 1008. The electronic device 1001 may include a processor 1020, a memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module (SIM) 1096, or an antenna module 1097. In one embodiment, at least one (e.g., the display device 1060 or the camera module 1080) of the components may be omitted from the electronic device 1001, or one or more other components may be added to the electronic device 1001. In one embodiment, some of the components may be implemented as a single integrated circuit (IC). For example, the sensor module 1076 (e.g., a fingerprint sensor, an iris sensor, or an illuminance sensor) may be embedded in the display device 1060 (e.g., a display).

The processor 1020 may execute, for example, software (e.g., a program 1040) to control at least one other component (e.g., a hardware or a software component) of the electronic device 1001 coupled with the processor 1020, and may perform various data processing or computations. As at least part of the data processing or computations, the processor 1020 may load a command or data received from another component (e.g., the sensor module 1076 or the communication module 1090) in volatile memory 1032, process the command or the data stored in the volatile memory 1032, and store resulting data in non-volatile memory 1034. The processor 1020 may include a main processor 1021 (e.g., a central processing unit (CPU) or an application processor (AP)), and an auxiliary processor 1023 (e.g., a graphics processing unit (GPU), an image signal processor (ISP), a sensor hub processor, or a communication processor (CP)) that is operable independently from, or in conjunction with, the main processor 1021. Additionally or alternatively, the auxiliary processor 1023 may be adapted to consume less power than the main processor 1021, or execute a particular function. The auxiliary processor 1023 may be implemented as being separate from, or a part of, the main processor 1021.

The auxiliary processor 1023 may control at least some of the functions or states related to at least one component (e.g., the display device 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to one embodiment, the auxiliary processor 1023 (e.g., an image signal processor or a communication processor) may be implemented as part of another component (e.g., the camera module 1080 or the communication module 1090) functionally related to the auxiliary processor 1023.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input device 1050 may receive a command or data to be used by other component (e.g., the processor 1020) of the electronic device 1001, from the outside (e.g., a user) of the electronic device 1001. The input device 1050 may include, for example, a microphone, a mouse, or a keyboard.

The sound output device 1055 may output sound signals to the outside of the electronic device 1001. The sound output device 1055 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 1060 may visually provide information to the outside (e.g., a user) of the electronic device 1001. The display device 1060 may include, for example, a display, a hologram device, or a projector and control circuitry to control a corresponding one of the display, hologram device, and projector. According to one embodiment, the display device 1060 may include touch circuitry adapted to detect a touch, or sensor circuitry (e.g., a pressure sensor) adapted to measure the intensity of force incurred by the touch.

The audio module 1070 may convert a sound into an electrical signal and vice versa. According to one embodiment, the audio module 1070 may obtain the sound via the input device 1050, or output the sound via the sound output device 1055 or a headphone of an external electronic device 1002 directly (e.g., wired) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. The sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor, The interface 1077 may support one or more specified protocols to be used for the electronic device 1001 to be coupled with the external electronic device 1002 directly (e.g., wired) or wirelessly. According to one embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device 1002. According to one embodiment, the connecting terminal 1078 may include, for example, an HDMI connector, a USB connector, an SD card connector, or an audio connector (e.g., a headphone connector).

The haptic module 1079 may convert an electrical signal into a mechanical stimulus (e.g., a vibration or a movement) or an electrical stimulus which may be recognized by a user via tactile sensation or kinesthetic sensation. According to one embodiment, the haptic module 1079 may include, for example, a motor, a piezoelectric element, or an electrical stimulator.

The camera module 1080 may capture a still image or moving images. According to one embodiment, the camera module 1080 may include one or more lenses, image sensors, image signal processors, or flashes.

The power management module 1088 may manage power supplied to the electronic device 1001. The power management module 1088 may be implemented as at least part of, for example, a power management integrated circuit (PMIC).

The battery 1089 may supply power to at least one component of the electronic device 1001. According to one embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the AP) and supports a direct (e.g., wired) communication or a wireless communication. According to one embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or a standard of the Infrared Data Association (IrDA)) or the second network. 1099 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The antenna module 1097 may transmit or receive a signal or power to or from the outside (e.g., the external electronic device) of the electronic device 1001. According to one embodiment, the antenna module 1097 may include one or more antennas, and, therefrom, at least one antenna appropriate for a communication scheme used in the communication network, such as the first network 1098 or the second network 1099, may be selected, for example, by the communication module 1090 (e.g., the wireless communication module 1092). The signal or the power may then be transmitted or received between the communication module 1090 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 1001 and the external electronic device 1004 via the server 1008 coupled with the second network 1099. Each of the electronic devices 1002 and 1004 may be a device of a same type as, or a different type, from the electronic device 1001. All or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, or client-server computing technology may be used, for example.

One embodiment may be implemented as software (e.g., the program 1040) including one or more instructions that are stored in a storage medium (e.g., internal memory 1036 or external memory 1038) that is readable by a machine (e.g., the electronic device 1001). For example, a processor of the electronic device 1001 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method, comprising:
receiving a number of physical downlink control channels (PDCCHs) for decoding;
determining a maximum number of valid downlink control information (DCIs) distributed in a plurality of monitoring occasions (MOs) included in a span that can be decoded as a function of a total number of the plurality of MOs included in the span, wherein the maximum number of valid DCIs that can be decoded is determined per MO as a function of subcarrier spacing (SCS) of a scheduling cell or as a function of span patterns supported by a user equipment (UE);
increasing a maximum number of PDCCHs that can be decoded based on the determined maximum number of valid DCIs; and
decoding the number of PDCCHs based on the increased maximum number of PDCCHs.

2. The method of claim 1, wherein the maximum number of valid DCIs that can be decoded per MO is configured by a network.

3. The method of claim 1, wherein the maximum number of valid DCIs that can be decoded per MO is determined as a function of subcarrier spacing (SCS) of a scheduling cell.

4. The method of claim 1, wherein the maximum number of valid DCIs that can be decoded per MO is determined as a function of span patterns supported by a user equipment (UE).

5. The method of claim 1, wherein the maximum number of valid DCIs that can be decoded per MO is determined based on a maximum number of valid DCIs that can be decoded per span and the total number of the plurality of MOs included in the span.

6. The method of claim 1, wherein determining the maximum number of valid DCIs that can be decoded comprises determining a maximum number of valid DCIs that can be decoded per span.

7. The method of claim 6, wherein the maximum number of valid DCIs that can be decoded per span is determined as a function of SCS of a scheduling cell.

8. A system, comprising:
a memory; and
a processor configured to:
receive a number of physical downlink control channels (PDCCHs) for decoding;
determine a maximum number of valid downlink control information (DCIs) distributed in a plurality of monitoring occasions (MOs) included in a span that can be decoded as a function of a total number of the plurality of MOs included in the span, wherein the maximum number of valid DCIs that can be decoded is determined per MO as a function of subcarrier spacing (SCS) of a scheduling cell or as a function of span patterns supported by a user equipment (UE);
increase a maximum number of PDCCHs that can be decoded based on the determined maximum number of valid DCIs; and
decode the number of PDCCHs based on the increased maximum number of PDCCHs.

9. The system of claim 8, wherein the maximum number of valid DCIs that can be decoded per MO is configured by a network.

10. The system of claim 8, wherein the maximum number of valid DCIs that can be decoded per MO is determined as a function of subcarrier spacing (SCS) of a scheduling cell.

11. The system of claim 8, wherein the maximum number of valid DCIs that can be decoded per MO is determined as a function of span patterns supported by a user equipment (UE).

12. The system of claim 8, wherein the maximum number of valid DCIs that can be decoded per MO is determined based on a maximum number of valid DCIs that can be decoded per span and the total number of the plurality of MOs included in the span.

13. The system of claim 8, wherein the processor is configured to determine the maximum number of valid DCIs that can be decoded by determining a maximum number of valid DCIs that can be decoded per span.

14. The system of claim 13, wherein the maximum number of valid DCIs that can be decoded per span is determined as a function of SCS of a scheduling cell.

* * * * *